United States Patent
Kiyosawa et al.

(10) Patent No.: US 8,286,252 B2
(45) Date of Patent: Oct. 9, 2012

(54) RIGHTS OBJECT MOVING METHOD, CONTENT PLAYER, AND SEMICONDUCTOR DEVICE

(75) Inventors: Yuta Kiyosawa, Hiroshima (JP); Mami Kuramitsu, Hiroshima (JP); Futoshi Nakabe, Hiroshima (JP)

(73) Assignee: Panasonic Corporation, Osaka (JP)

( * ) Notice: Subject to any disclaimer, the term of this patent is extended or adjusted under 35 U.S.C. 154(b) by 405 days.

(21) Appl. No.: 12/528,199

(22) PCT Filed: Jan. 25, 2008

(86) PCT No.: PCT/JP2008/051076

§ 371 (c)(1),
(2), (4) Date: Aug. 21, 2009

(87) PCT Pub. No.: WO2008/102601

PCT Pub. Date: Aug. 28, 2008

(65) Prior Publication Data

US 2010/0017887 A1    Jan. 21, 2010

(30) Foreign Application Priority Data

Feb. 23, 2007    (JP) ................................ 2007-044652

(51) Int. Cl.
    G06F 7/04    (2006.01)
(52) U.S. Cl. .......................................... 726/26; 713/193
(58) Field of Classification Search .................. 713/193; 380/200–202; 726/26–30; 711/100, 111, 711/145, 152; 705/50–52, 57, 59
    See application file for complete search history.

(56) References Cited

U.S. PATENT DOCUMENTS

| 7,472,427 B2* | 12/2008 | Shimojima et al. ............. 726/31 |
| 2002/0165825 A1* | 11/2002 | Matsushima et al. ........... 705/51 |
| 2003/0120943 A1* | 6/2003 | Hughes ......................... 713/193 |
| 2005/0210249 A1* | 9/2005 | Lee et al. ...................... 713/168 |
| 2006/0154648 A1* | 7/2006 | Oh et al. ....................... 455/411 |

(Continued)

FOREIGN PATENT DOCUMENTS

EP    1 045 386    10/2000

(Continued)

OTHER PUBLICATIONS

International Search Report issued May 13, 2008 in International (PCT) Application No. PCT/JP2008/051076, filed Jan. 25, 2008.

(Continued)

*Primary Examiner* — Nirav B Patel
(74) *Attorney, Agent, or Firm* — Wenderoth, Lind & Ponack, L.L.P.

(57) ABSTRACT

A method of moving a rights object according to the present invention includes the following steps. First, a rights object in the memory card is disabled. Then, the rights object is copied from the memory card in response to a retrieval request and installed to a content player. After the installation, a removal request is transmitted to the memory card and the rights object in the memory card is removed (deleted). After transmitting the removal request, second state information is generated and held in the content player to indicate that the removal of the rights object in the memory card has not yet been completed and that the rights object installed in the content player is conditionally enabled. When the memory card receives the removal request, the memory card removes the rights object from the memory card and transmits a removal response for notifying completion of the removal to the content player.

12 Claims, 11 Drawing Sheets

U.S. PATENT DOCUMENTS

2008/0155683 A1 * 6/2008 Kim et al. .................. 726/21

FOREIGN PATENT DOCUMENTS

| EP | 1 045 388 | 10/2000 |
|---|---|---|
| JP | 2000-347946 | 12/2000 |
| JP | 2003-536144 | 12/2003 |
| JP | 2004-54988 | 2/2004 |
| JP | 2004-355394 | 12/2004 |
| JP | 2006-65503 | 3/2006 |
| WO | 2005/091163 | 9/2005 |

OTHER PUBLICATIONS

Supplementary European Search Report mailed on Jun. 15, 2010 in corresponding European Patent Application No. 08703903.8.

* cited by examiner

FIG. 11A

| Error | Log (Second State Information) | First State Information | Recovery Processing |
|---|---|---|---|
| None | None (no rights object) | Enabled | |
| A, B | not-yet-retrieved | Enabled | Remove log |
| C, D | not-yet-installed | Disabled | Enable rights object in memory card |
| E, F | not-yet-removed | Disabled | Remove rights object from memory card |
| G | not-yet-removed | None | Remove log |
| None | None (with rights object) | None | |

FIG. 11B

| Error | State Information | State Information | Recovery Processing |
|---|---|---|---|
| None | None | Enabled | |
| A, B | None | Enabled | |
| C, D | None | Disabled | Enable rights object in memory card |
| E, F | Conditionally Enabled | Disabled | Remove rights object from memory card |
| G | Conditionally Enabled | None | Enable rights object in terminal |
| None | Enabled | None | |

US 8,286,252 B2

RIGHTS OBJECT MOVING METHOD, CONTENT PLAYER, AND SEMICONDUCTOR DEVICE

TECHNICAL FIELD

The present invention relates to a method of controlling a move of a rights object between (i) a system using a content having a protected copyright utilizing the rights object and (ii) a memory card connected to the system.

BACKGROUND ART

In the recent fields of Digital Rights Management (DRM) technologies, a method of separately distributing (i) an encrypted content such as a music content and (ii) a rights object (in other words, rights information) to be utilized to use the encrypted content has been used. The rights object indicates designated constraint information such as counts at which the content is permitted to be used. The content is allowed to be used only within the constraints of the constraint information.

In the meanwhile, among mobile terminals such as mobile telephones, terminals for which memory cards can serve as external memories have been widely used. Therefore, the memory cards can hold data to be used by the terminals, for example. Such a terminal using a memory card as an external memory can store the above-mentioned rights object to the memory, when a content having a protected copyright is permitted to be used according to the rights object. However, if a rights object which is prohibited from being copied is copied to be stored in the memory card, rights of the rights object are allowed to be used in other terminals without permission. Therefore, a rights object is generally permitted to be moved only between the terminal and the memory card.

Patent Reference 1 discloses a method for moving a rights object from a memory card to a terminal. By the method of Patent Reference 1, the rights object is assigned with state information indicating whether the rights object is disabled (in other words, in a disabled state) or enabled (in other words, in an enabled state). Thereby, when the rights object is to be moved from the memory card to the terminal, the rights object in the memory card is disabled, and the disabled rights object is copied to the terminal. After copying, the rights object in the memory card is removed (in other words, deleted), and the rights object in the terminal is enabled.

During the above procedure, error would occur due to, for example, taking out of the memory card or power discontinuity. The terminal performs a recovery procedure for recovering a situation of the rights object from defects caused by the error.

FIG. 1 is a flowchart showing the recovery procedure in the prior art.

If an error occurs before the rights object is copied to the terminal (in other words, when the terminal does not have an enabled rights object) (No at 601), then disabled rights object in the memory card is enabled (602, 603). Thereby, a situation of the rights object is recovered to be in an original situation that is before the copying. If an error occurs after the rights object has been copied to the terminal (in other words, when the terminal has the enabled rights object) (Yes at 601), then the disabled rights object in the memory card is removed (deleted) (605). Thereby, the situation of the rights object is recovered to be in the situation that is after the copying.

[Patent Reference 1] Japanese Unexamined Patent Application Publication No. 2000-347946

DISCLOSURE OF INVENTION

Problems that Invention is to Solve

Unfortunately, the above-described conventional method disclosed in Patent Reference 1 has the following problem. If the memory card is taken out from the terminal during a period from completion of copying the rights object to the terminal to completion of removing (deleting) the rights object from the memory card, the disabled rights object is left in the memory card. In this situation, the recovery procedure fails, because the rights object in the terminal remains in the disabled state and thereby a content cannot be used utilizing the rights object.

Furthermore, when the rights object is copied from the memory card to the terminal and enabled to be stored, the state of the rights object in the terminal is always the enabled state. Therefore, even if the memory card is taken out from the terminal when the memory card has the disabled rights object, rights of the rights object in the terminal can be consumed. Still further, since in the conventional recovery procedure a recovery method is decided by determining whether or not the terminal has the rights object. Therefore, if all of rights in the rights object in the terminal are consumed and the rights object is removed (deleted), the disabled rights object in the memory card is wrongly enabled. As a result, when inserting the memory card to another terminal, the rights object is actually copied and allowed to be used without permission.

Thus, the present invention overcomes the problems as described above. It is an object of the present invention to provide a rights object moving method and a content player which permit rights to be consumed at the time of completing move of a rights object to the content player (terminal) and prevent the recovery procedure from wrongly allowing the rights object to be used without permission.

Means to Solve the Problems

In accordance with an aspect of the present invention for achieving the object, there is provided a rights object moving method of moving a rights object indicating use rights of a content from a memory card to a content player, the memory card being capable of being inserted to and taken out from the content player and holding (a) the rights object and (b) a first state information indicating whether or not the rights object is enabled or disabled, the rights object moving method including: transmitting, from the content player to the memory card, a retrieval request for providing the rights object to the content player; changing the first state information indicating that the rights object in the memory card is enabled to indicate that the rights object in the memory card is disabled, when the memory card receives the retrieval request; installing, to the content player, the rights object provided from the memory card in response to the retrieval request; transmitting a removal request from the content player to the memory card upon completing the installing, the removal request requesting to remove the rights object in the memory card; generating second state information to be held in the content device after the transmitting of the removal request, the second state information indicating that removing of the rights object in the memory card has not yet been completed; and controlling to (i) prohibit the rights object in the content player from being moved or removed and (ii) permit the rights object in the content player to be used to play the content, when the second state information indicates that the removing of the rights object in the memory card has not yet been completed.

Thereby, the rights object installed from the memory card to the content player is not in an enabled state. Therefore, the existence of such a non-enabled rights object in the content player expresses that a source rights object (namely, the rights object in the memory card from which the non-enabled rights object has been installed to the content player) has not yet been removed (deleted) from the memory card. As a result, it is possible to prevent the rights object from being used without permission by maliciously using the recovery procedure. More specifically, the rights object storing in the content player and corresponding to the second state information indicating that the removal (deletion) of the source rights object to be removed has not yet been completed is prohibited from being moved and removed (deleted) but permitted to be used to play an associated content in the content player. Thereby, even if the content player has consumed all rights of the rights object, the rights object is prohibited from being moved and removed (deleted). Thereby, it is possible to prevent the disabled rights object from being used without permission when the recovery procedure wrongly enables the disabled rights object.

Furthermore, the rights object moving method may further include: removing the rights object in the memory card and transmitting a removal response for notifying completion of the removing from the memory card to the content player, when the memory card receives the removal request; and removing, from the content player, the second state information indicating that the removing of the rights object in the memory card has not yet been completed, when the content player receives the removal response.

Still further, the rights object moving method may further include: removing the rights object in the memory card and transmitting a removal response for notifying completion of the removing from the memory card to the content player, when the memory card receives the removal request; and updating the second state information indicating that the removing of the rights object in the memory card has not yet been completed to indicate that the rights object in the content player is enabled, when the content player receives the removal response.

Thereby, if there has been no error but an error occurs during a period from completion of installing the rights object from the memory card to the content player to completion of removing (deleting) the disabled rights object from the memory card, the content player holds the second state information indicating that the removal of the rights object in the memory card has not yet been completed (in other words, "not-yet-removed" state), until the removal of the (disabled) rights object from the memory card is completed by the recovery procedure. As a result, it is possible to prevent the rights object from being used without permission. Moreover, when the second state information is changed to indicate that the rights object is enabled, a content associated with the rights object can be used without being constrained to be within a range of the rights object.

Still further, the rights object moving method may further include: determining that the rights object in the content player is enabled and permitting the rights object in the content player to be used to play the content, when the content player does not have the second state information indicating that the removing of the rights object in the memory card has not yet been completed.

Thereby, if the second state information itself is removed (deleted), the rights object in the content player is determined to be in the enabled state. As a result, a content associated with the rights object can be used without being constrained to be within a range of the rights object.

Still further, the generating may include: generating second state information to be held in the content device after starting the installing, the second state information indicating that the installing of the rights object has not yet been completed; and updating, after the transmitting of the removal request, the second state information indicating (i) that the installing of the rights object has not yet been completed to indicate (ii) that the removing of the rights object in the memory card has not yet been completed.

Thereby, the second state information expresses that installation of the retrieved rights object in the content player has not yet been completed (in other words, "not-yet-installed" state) that is a state prior to the "not-yet-removed" state. As a result, this enables the recovery procedure to be worked more flexibly when an error occurs during moving the rights object.

Still further, the generating may include: generating second state information to be held in the content device after the transmitting of the retrieval request, the second state information indicating that the providing of the rights object from the memory card to the content player has not yet been started; updating, after starting the installing, the second state information indicating that the providing of the rights object from the memory card to the content player has not yet been started to indicate that the installing of the rights object has not yet been completed; and updating, after the transmitting of the removal request, the second state information indicating (i) that the installing of the rights object has not yet been completed to indicate (ii) that the removing of the rights object in the memory card has not yet been completed.

Thereby, the second state information expresses the "not-yet-installed" state that is a state prior to the "not-yet-removed" state and a "non-yet-retrieved" state where providing of the rights object from the memory card to the content player has not yet been started that is a state prior to the "not-yet-installed" state. As a result, this enables the recovery procedure to be worked more flexibly when an error occurs during moving the rights object.

Still further, the rights object moving method may further include recovering a situation of the rights object, wherein the recovering includes removing the rights object in the memory card and the first state information from the memory card, when (i) the content player has the second state information indicating that the removing of the rights object in the memory card has not yet been completed and (ii) the memory card has the first state information indicating that the rights object in the memory card is disabled.

Thereby, the second state information indicating the "not-yet-removed" state is not removed (deleted) even after consuming the rights object in the content player. Therefore, the disabled rights object is removed from the memory card without being enabled. As a result, it is possible to prevent the rights object from being used without permission by maliciously utilizing the conventional recovery procedure.

Still further, the recovering may further include updating the second state information indicating that the removing of the rights object in the memory card has not yet been completed to indicate that the rights object in the content player is enabled, when (i) the content player has the second state information indicating that the removing of the rights object in the memory card has not yet been completed and (ii) the memory card does not have the rights object.

Thereby, when an error occurs in the removal response from the memory card and the second state information indicating the "not-yet-removed" state remains in the content player even if the disabled rights object in the memory card has been removed, it is possible to correctly recover the second state information to indicate that the rights object in the content player is in the enabled state.

Still further, the rights object moving method may further include recovering a situation of the rights object, wherein the recovering includes removing the rights object in the memory card and the first state information from the memory card, when (i) the content player has the second state information indicating that the removing of the rights object in the memory card has not yet been completed and (ii) the memory card has the first state information indicating that the rights object in the memory card is disabled.

Thereby, when an error occurs in the removal response transmitted from the memory card but the second state information indicating the "not-yet-removed" state remains in the content player even if the removal of the disabled rights object in the memory card has been completed, the second state information is removed. By this recovery procedure, the absence of second state information can expresses that the rights object is in the general enabled state.

Still further, the rights object moving method may further include recovering a situation of the rights object, wherein the recovering further includes changing the first state information in the memory card to indicate that the rights object in the memory card is enabled, when (i) the content player has the second state information indicating that the installing of the rights object has not yet been completed and does not have the rights object, and (ii) the memory card has (ii-1) the first state information indicating that the rights object in the memory card is disabled and (ii-2) the rights object.

Thereby, when an error occurs before installing the rights object from the memory card to the content player, it is possible to recover a situation of the rights object to be in the situation that is before starting moving.

Moreover, the present invention is implemented not only as the above-described rights object moving method, but also as a content player, a semiconductor device, or a program, each of which has the same features as described above.

Effects of the Invention

The present invention can prevent a rights object from being used without permission by maliciously utilizing recovery procedures.

The present invention can prohibit a disabled rights object from being used without permission due to a recovery procedure enabling the disabled rights object.

In addition, the present invention enables the recovery procedure to be more flexible for errors occurred during moving a rights object.

BRIEF DESCRIPTION OF DRAWINGS

FIG. 11A is a table regarding recovery procedures corresponding to respective occurred errors according to Embodiment 2.

FIG. 11B is a table regarding recovery procedures corresponding to respective occurred errors according to Embodiment 1.

Figure 1:
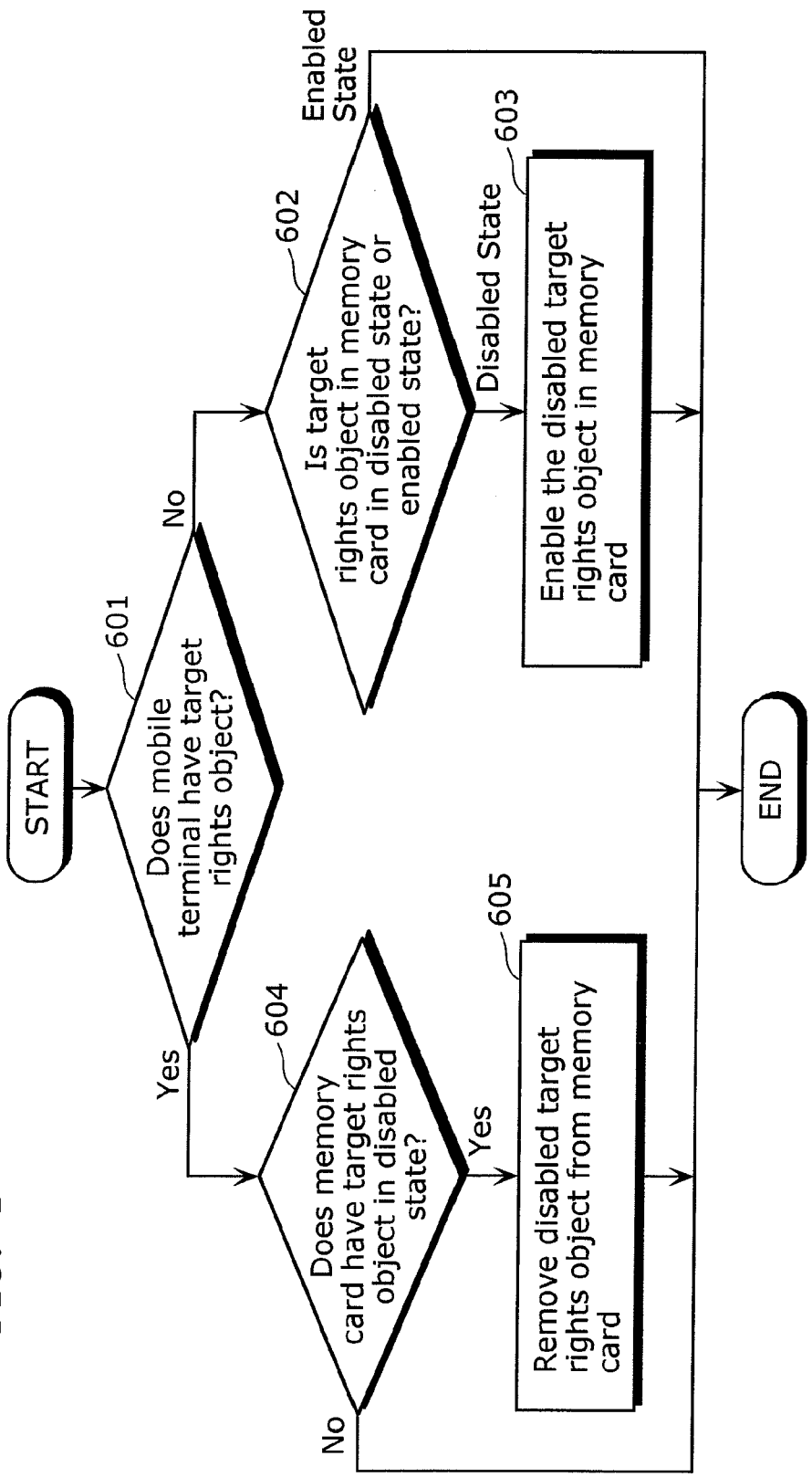
FIG. 1 is a flowchart showing a recovery procedure according to the prior art.

NUMERICAL REFERENCES 1 mobile terminal
2 memory card
201 rights state determination unit
202 rights state change unit
203 storage control unit
204 rights management unit
205 memory card access unit
206 rights determination unit
207 content play unit
208 use information retrieval unit
209 storage unit
210 content
211 rights object
212 rights state information

BEST MODE FOR CARRYING OUT THE INVENTION (Embodiment 1)

Figure 2:
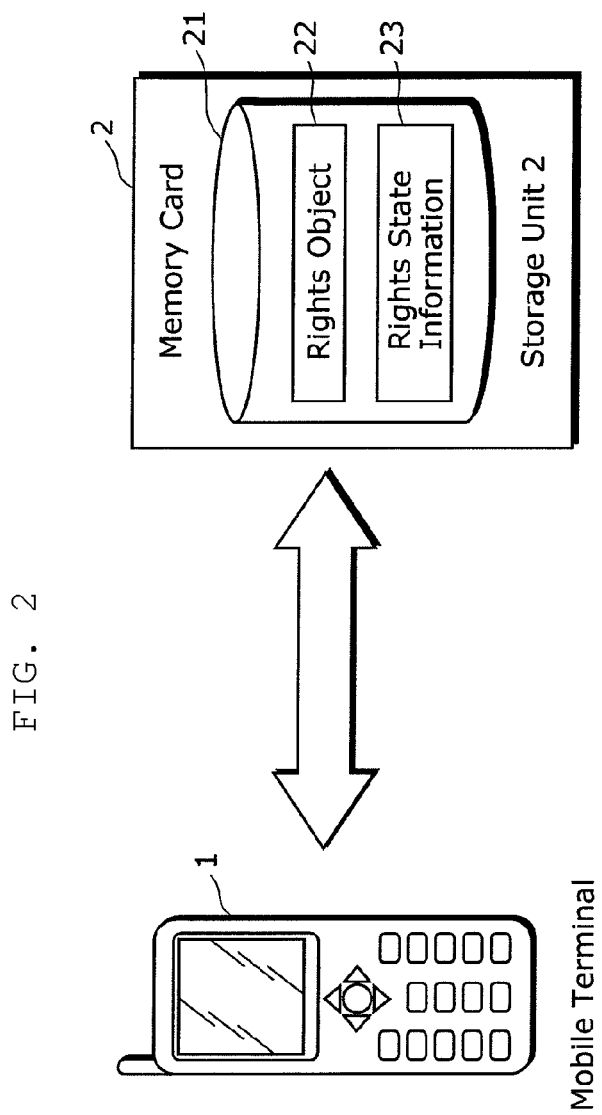
FIG. 2 is a diagram showing an example of a configuration of a system including a content player according to Embodiment 1 of the present invention.

The following describes Embodiment 1 according to the present invention with reference to the drawings. FIG. 2 is a diagram showing a configuration of a system according to Embodiment 1 of the present invention. The system includes (i) a mobile terminal 1 that is a content player and (ii) a memory card 2.

Figure 3:
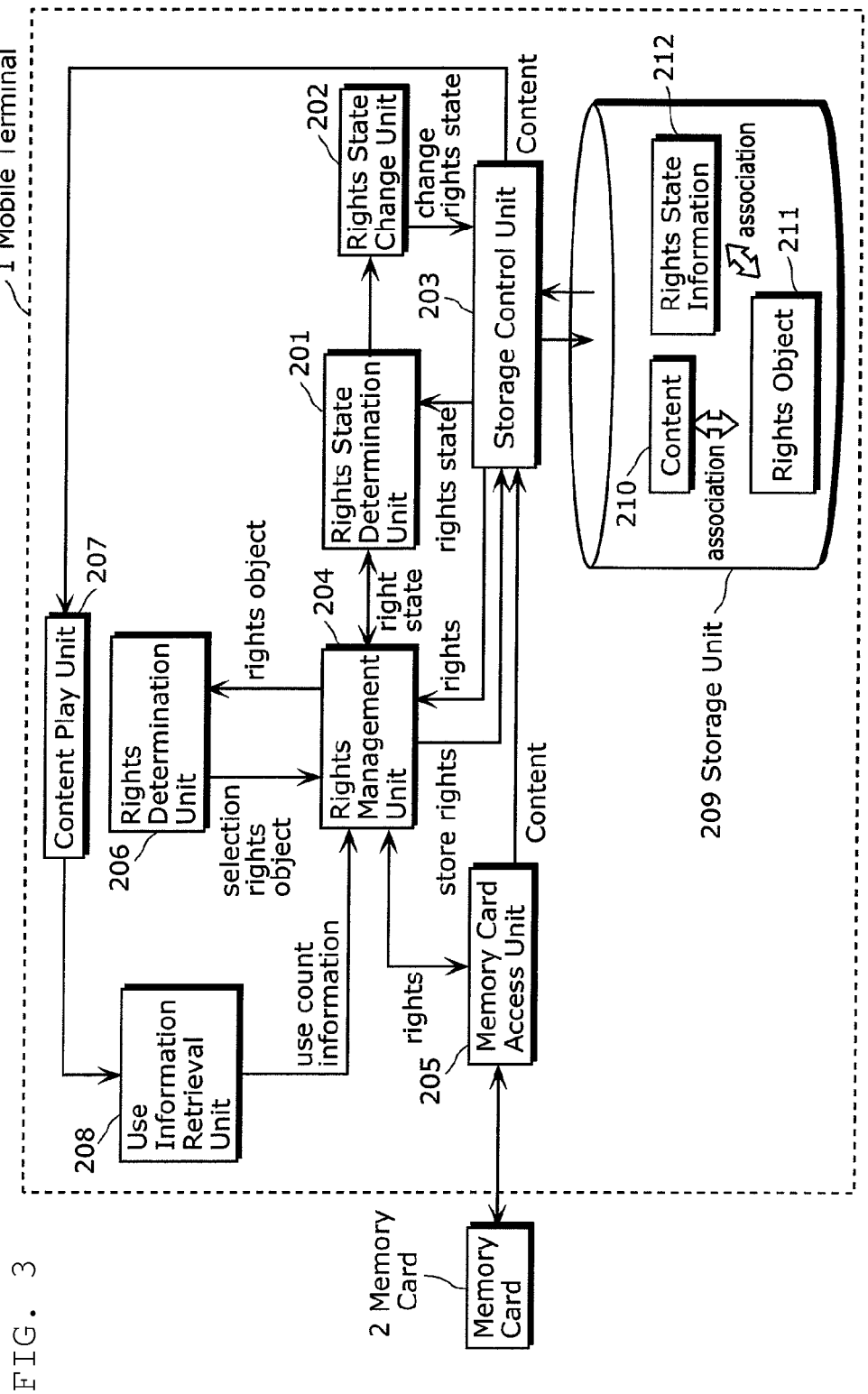
FIG. 3 is a block diagram showing a structure of a mobile terminal according to Embodiment 1 of the present invention.

FIG. 3 is a block diagram showing a structure of the mobile terminal 1 according to Embodiment 1 of the present invention. As shown in FIG. 3, the mobile terminal 1 includes a rights state determination unit 201, a rights state change unit 202, a storage control unit 203, a rights management unit 204, a memory card access unit 205, a rights determination unit 206, a content play unit 207, a use information retrieval unit 208, and a storage unit 209.

First, each of the units in the mobile terminal 1 (hereinafter, referred to also as a "terminal") is described briefly.

The rights state determination unit 201 retrieves information of a state (hereinafter, referred to simply as a "state", a "rights state", or "rights state information") of a designated rights object, and determines whether or not the rights object is permitted to be moved and removed (deleted). In addition, based on a result of copying or removing the rights object held in the memory card, the rights state determination unit 201 determines which state the rights object in the terminal is to be updated to, and then requests the rights state change unit 202 to update the current state of the rights object to the determined state. The rights state change unit 202 updates rights state information 212 of the designated rights object, based on the request (state update request) from the rights state determination unit 201.

The storage control unit 203 stores a content to the storage unit 209 in response to a request from the memory card access unit 205. The storage control unit 203 also stores the rights object to the storage unit 209 in response to a request from the rights management unit 204. The storage control unit 203 further stores the rights state information to the storage unit 209 in response to a request from the rights state change unit 202. In addition, the storage control unit 203 reads out the rights state information from the storage unit 209 in response to a request from the rights state determination unit 201.

The rights management unit 204 controls the rights object stored in the memory card 2 to be moved to the mobile terminal 1, requesting the memory card access unit 205 to read or remove (delete) the rights object. Furthermore, the rights management unit 204 associates the rights object read from the memory card 2 with a corresponding content. Then, the rights management unit 204 requests the storage control unit 203 to control to store the rights object and at the same time notifies the rights state determination unit 201 of that copying of the rights object is completed. The rights management unit 204 also notifies the rights state determination unit 201 of that removing of the disabled rights object from the memory card is completed. Still further, the rights management unit 204 controls the rights object stored in the mobile terminal 1 to be moved to the memory card 2 and to be removed, requesting the storage control unit 203 to read and removed the rights object. When a content having a protected copyright is to be used, the rights management unit 204 requests the storage control unit 203 to retrieve a rights object associated with the protected content, and requests the rights determination unit 206 to make determination regarding the retrieved rights object. After using the content having the protected copyright, the rights management unit 204 requests the use information retrieval unit 208 to retrieve use information of the rights object, updates the rights object, and instructs the storage control unit 203 to store the updated rights object.

The memory card access unit 205 controls connection with the memory card 2, and reads and removes (deletes) a content 21 and a rights object 22 from the memory card 2. The memory card access unit 205 also writes the rights object stored in the mobile terminal 1 to the memory card in response to a request from the rights management unit 204.

Figure 4:
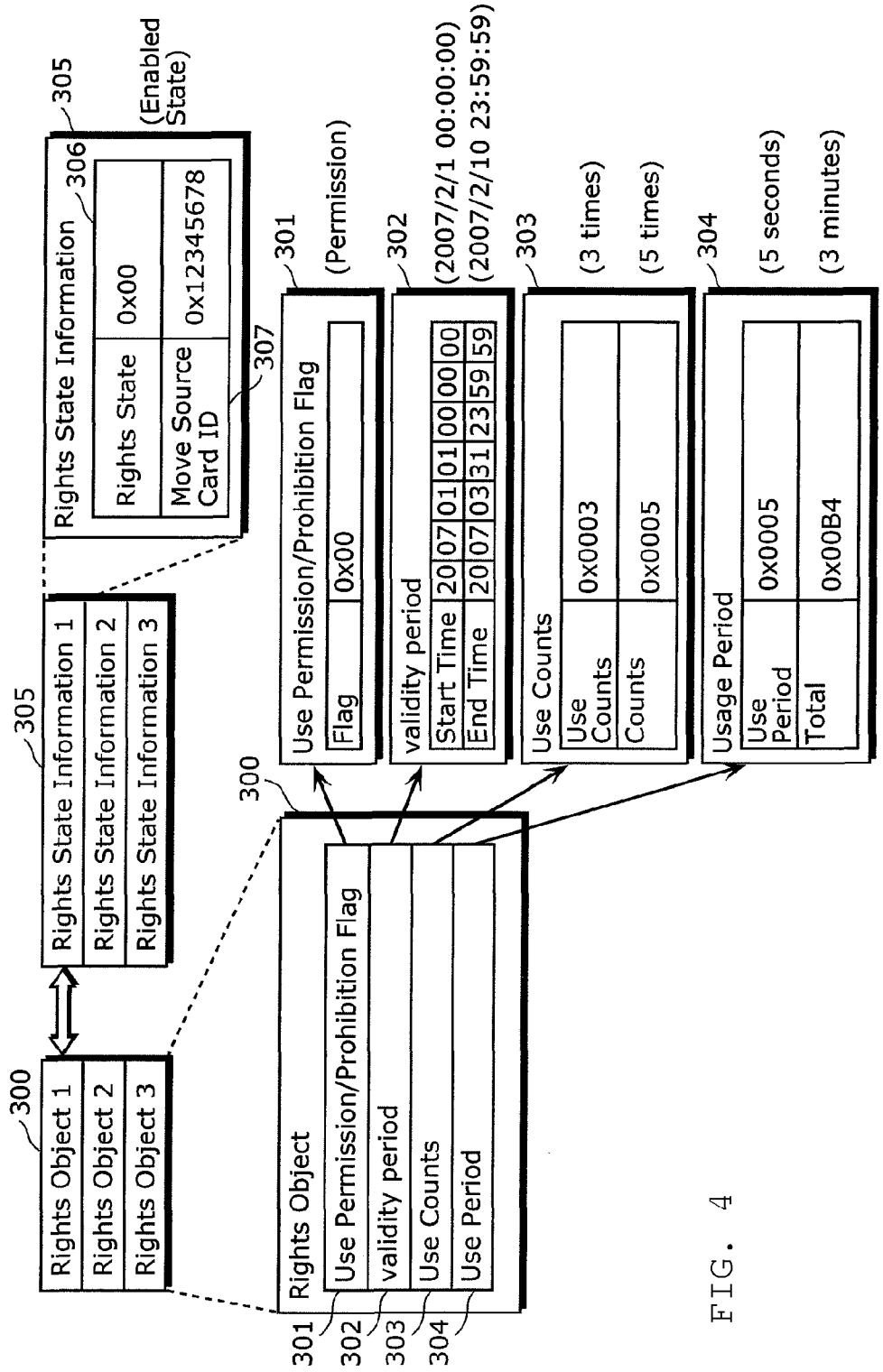
FIG. 4 is a diagram showing an example of data structures of a rights object and rights state information.

When a content having a protected copyright is to be used, in response to a request from the rights management unit 204, the rights determination unit 206 confirms constraint information of the rights object associated with the content in order to determine whether or not the content is permitted to be used. The content play unit 207 plays the permitted content, and after the play, notifies the use information retrieval unit 208 of use information such as counts of playing (hereinafter, referred to as "play counts"). The use information retrieval unit 208 stores the use information of rights notified from the content play unit 207, and moves the use information to the rights management unit 204 in response to a request. The storage unit 209 stores a content 210, a rights object 211, and rights state information 212. FIG. 4 is a schematic diagram showing a data structure of the rights object 211 (the reference numeral is assigned also as 300 in FIG. 4) and a data structure of the rights state information 212 (the reference numeral is assigned also as 305 in FIG. 4).

The rights object 300 includes detailed pieces of information which are: a use permission/prohibition flag 301 designating to permit or prohibit use of rights (for example, designating whether or not the rights object satisfy constraint information designated in the rights object); a validity period 302 designating a start time and an end time of a validity period of the rights object; a use count 303 designating (i) counts of having used the rights object by the time of determining the rights object and (ii) predetermined counts which are predetermined at the time of retrieving the rights object; and a use time 304 indicating (i) a time period of having used the rights object by the time of determining the rights object and (ii) a predetermined time period which is predetermined at the time of retrieving the rights object. The rights state information 305 includes detailed pieces of information which are: a rights state 306 designating whether or not the rights object is permitted to be moved and removed (deleted); and a source card identification (ID) 307 designating information of a memory card in which the rights object has been stored before being moved to the mobile terminal. The use permission/prohibition flag 301 has two kinds of values which are a value indicating "permission" and a value indicating "prohibition". When a content having a protected copyright is to be used, the mobile terminal 1 does not use the rights object with the use permission/prohibition flag having the "prohibition" value. The rights state 306 has two kinds of values which are a value indicating an "enabled state" and a value indicating a "conditionally enabled state". The mobile terminal 1 does not constraint use of the rights object having the value of the "conditionally enabled state", but does not move the rights object to the memory card nor remove the rights object. On the other hand, the mobile terminal 1 does not constraint move of a rights object having the "enabled state" to the memory card nor remove the rights object.

Figure 5:
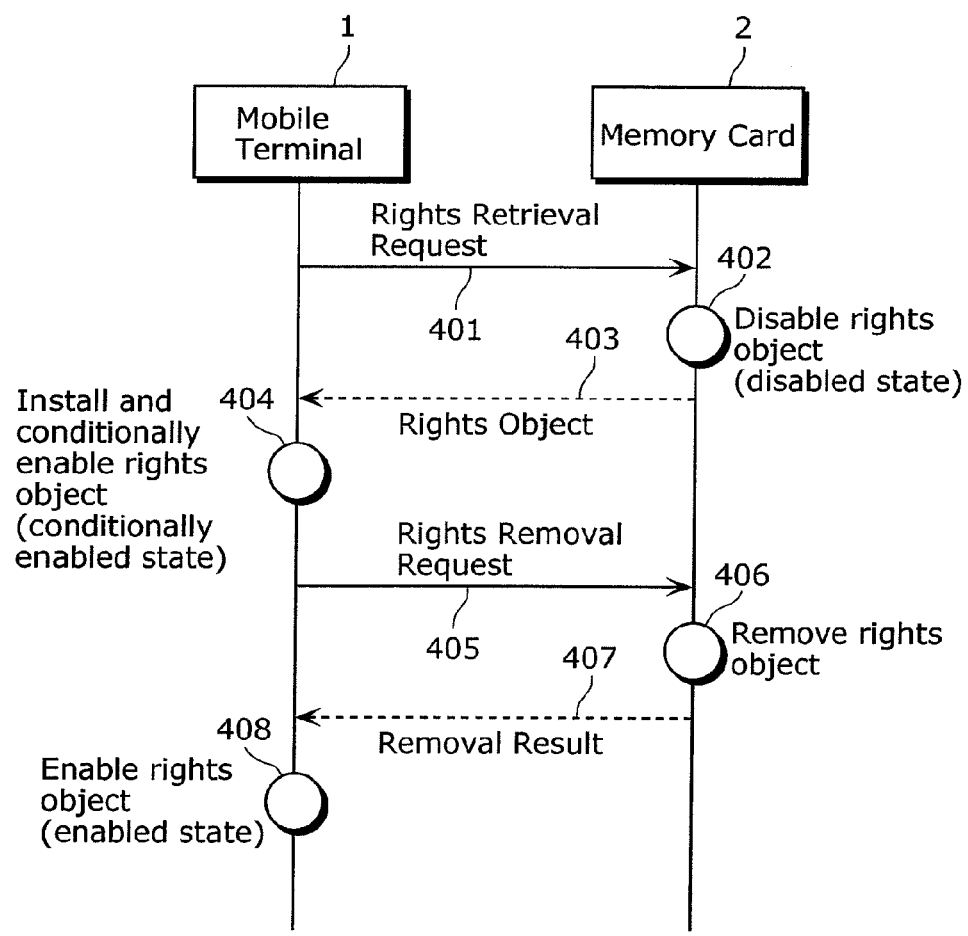
FIG. 5 is a diagram showing a sequence of moving a rights object from a memory card to a mobile terminal.

Next, description is given for a method of controlling move of a rights object which is performed by the mobile terminal 1 according to Embodiment 1 having the above-described structure. FIG. 5 is a schematic diagram showing a sequence of moving a rights object from the memory card to the terminal in the system of FIG. 2.

As shown in FIG. 5, the mobile terminal 1 requests the memory card 2 to provide a rights object (hereinafter, referred to as a "rights retrieval request") (401). The rights object in the memory card 2 is disabled (402), and then the mobile terminal 1 retrieves the disabled rights object from the memory card 2 (403). Then, the mobile terminal 1 installs (stores) the retrieved rights object into the mobile terminal 1 itself, conditionally enabling the disabled rights object (404). Upon completing the installation, the mobile terminal 1 requests the memory card to remove (delete) the rights object from the memory card 2 (405). The disabled rights object in the memory card is removed from the memory card (406), and the mobile terminal 1 is notified of a result of the removal (407). If the removal result is successful, the mobile terminal 1 enables the conditionally enabled rights object that has been retrieved from the memory card and is currently stored in the mobile terminal 1 (408).

Embodiment 1 of the present invention, is characterized in: the step 404 of storing the rights object to the mobile terminal 1 by conditionally enabling the rights object when the rights object is copied from the memory card 2 to the mobile terminal 1; and the step 408 of enabling the conditionally enabled rights object stored in the terminal after receiving the result of removing the source rights object from the memory card 2. The characteristics are described in more details with reference to FIG. 6.

Figure 6:
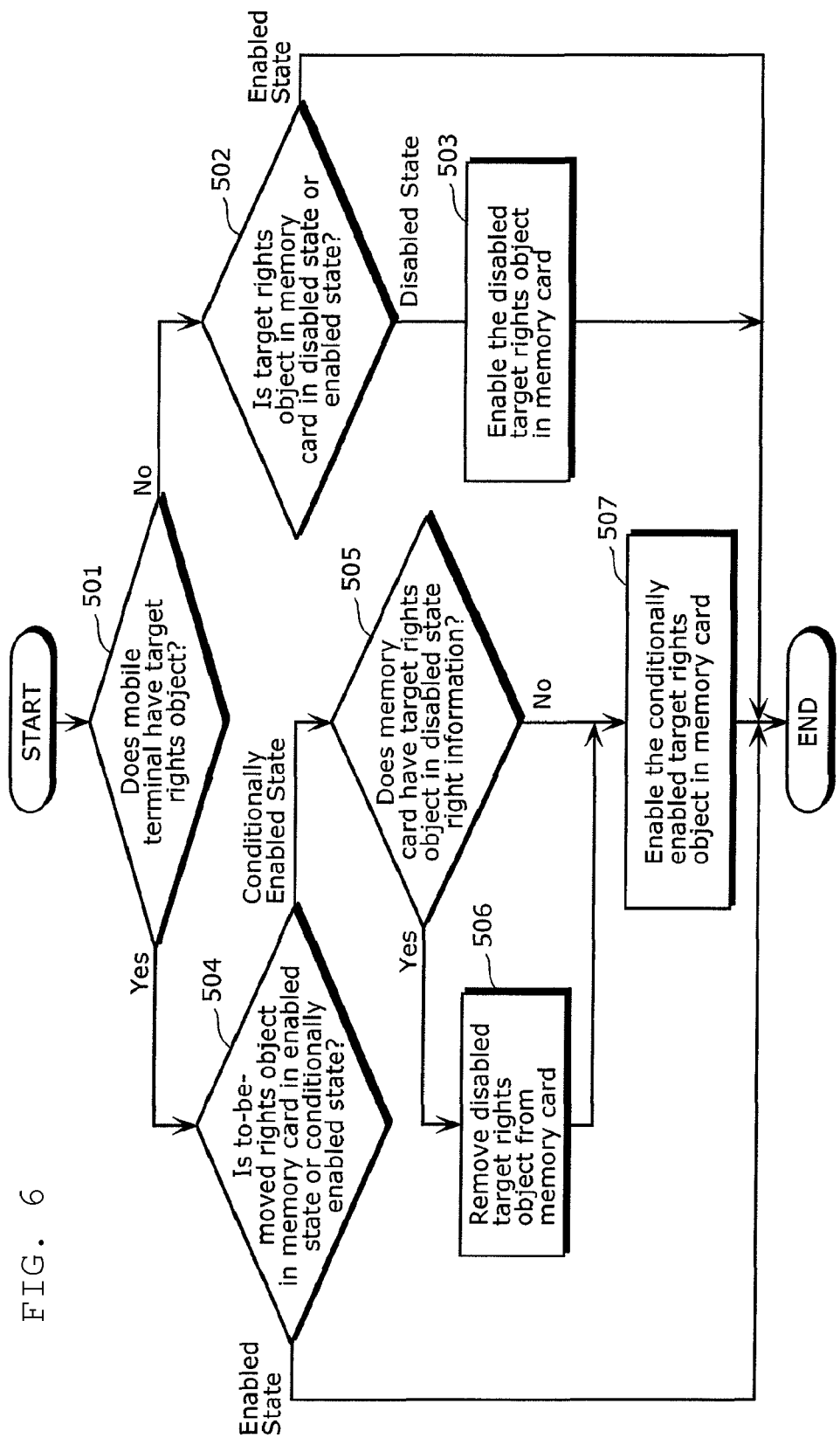
FIG. 6 is a flowchart showing a recovery procedure.

FIG. 6 is a flowchart showing a recovery procedure according to Embodiment 1 of the present invention. The recovery procedure of FIG. 6 is explained in comparison with the conventional recovery procedure of FIG. 1.

When an error occurs in a period from the step 401 to the step 402 of FIG. 5, a determination is made that the mobile terminal 1 does not have a target rights object (No at 501) and a further determination is made that the target rights object in the memory card is in an enabled sate (502). As a result, the recovery procedure is not necessary.

When an error occurs in a period from the step 403 to the step 404 of FIG. 5, the terminal does not have a target rights object and the memory card has the target rights object in a disabled state. In this case, in the conventional error recovery determination processing, a determination is made that the mobile terminal does not have a target rights object (No at 601) and a further determination is made that the target rights object in the memory card is in a disabled state (Disabled State at 602). As a result, the recovery procedure is necessary to enable the disabled rights object in the memory card (603). Likewise the conventional processing, in the error recovery determination processing according to Embodiment 1, a determination is made that the mobile terminal does not have a target rights object (No at 501) and a further determination is made that the target rights object in the memory card is in a disabled state (Disabled State at 502). As a result, the recovery procedure is necessary to enable the disabled rights object in the memory card (503). The above recovery procedure allows the target rights object in the memory card to be re-used.

When an error occurs in a period from the step 405 to the step 406 of FIG. 5, in the prior art, the terminal has a target rights object and the memory card has the target rights object in a disabled state. In this case, in the conventional error recovery determination processing, a determination is made that the mobile terminal has a target rights object (Yes at 601) and that the memory card has the target rights object in a disabled state (Yes at 604). As a result, the recovery procedure is necessary to remove (delete) the disabled target rights object from the memory card (605). In Embodiment 1 of the present invention, on the other hand, the terminal has a target rights object in a conditionally enabled state and the memory card has the target rights object in a disabled state. Therefore, in the error recovery determination processing, a determination is made that the mobile terminal has a target rights object (Yes at 501), a further determination is that the target rights object in the mobile terminal is in a conditionally enabled state (Conditionally Enabled State at 504), and a still further determination is made that the memory card has the target rights object in a disabled state (Yes at 505). As a result, the recovery procedure is necessary to remove the disabled target rights object from the memory card (506) and to enable the conditionally enabled target rights object in the mobile terminal (507). The above recovery procedure makes it possible to remove the rights object (source rights object) from the memory card and to allow the rights object in the mobile terminal to be re-used.

Here, when an error occurs in a period from the step 405 to the step 406 of FIG. 5 due to taking out of the memory card from the mobile terminal by a user, the above-described recovery procedure cannot be performed until the user inserts the memory card to the mobile terminal again, but the user is allowed to use the rights object in the mobile terminal.

In the prior art, when all rights in the rights object stored at the step 409 are consumed before the user re-inserts the memory card to the mobile terminal, the system sometimes automatically removes (deletes) the rights object from the mobile terminal. Or, the consumed rights object may be removed according to designation of the user. When the memory card is re-inserted to the mobile terminal after consuming and removing the rights object from the mobile terminal, the situation of the mobile terminal and the memory card are the same as the situation where an error occurs during the step 403, in other words, the mobile terminal does not have a target rights object and the memory card has the target rights object in a disabled state. Therefore, in the error recovery determination processing, a determination is made that the mobile terminal does not have a target rights object (No at 601) and a further determination is made that the target rights object in the memory card is in a disabled state (Disabled State at 602). Then, the recovery procedure is necessary to enable the disabled target rights object in the memory card (603). As a result, the rights object in the memory card is recovered and thereby the user can re-use the rights object without permission. On the other hand, in Embodiment 1 of the present invention, even if rights of the rights object stored in the mobile terminal at the step 404 are consumed before re-inserting the memory card to the mobile terminal by the user, the rights object in the mobile terminal is not removed (deleted) because the rights object is in the conditionally enabled state. Therefore, even if the memory card is re-inserted to the mobile terminal after consuming the rights object, the states of the rights object in the mobile terminal and the rights object in the memory card have not been changed since the error occurred during the step 406. As a result, the error recovery determination processing can be performed in the same manner as the processing that is performed before consuming the rights object, thereby preventing the rights object from being used by the user without permission.

When an error occurs in a period from the step 407 to the step 408 of FIG. 5, in the prior art, the mobile terminal has a target rights object and the memory card does not have the target rights object. Therefore, in the conventional error recovery determination processing, a determination is made that the mobile terminal has a target rights object (Yes at 601) and that the memory card does not have the target rights object (No at 604). As a result, the recovery procedure is not necessary. In Embodiment 1 of the present invention, on the other hand, the terminal has a target rights object in a conditionally enabled state and the memory card does not have the target rights object. Therefore, in the error recovery determination processing, a determination is made that the mobile terminal has a target rights object (Yes at 501), a further determination is made that the target rights object in the mobile terminal is in a conditionally enabled state (Conditionally Enabled State at 504), and a still further determination is made that the memory card does not have the target rights object (No at 505). As a result, the recovery procedure is necessary to enable the conditionally enabled rights object in the mobile terminal (507). The above error recovery procedure of Embodiment 1 of the present invention allows the target rights object in the mobile terminal to be used without any constraints on moving and removal, in the same manner as the prior art.

It should be noted that it has been described in Embodiment 1 that the rights object 300 and the rights state information 305 are managed as distinct different pieces of data, but the rights object 300 may include detailed pieces of information that are rights state information 306 and a move source card ID 307.

It should also be noted that the rights state information 305 may include detailed pieces of information that is a rights object ID. The rights object ID is kept even after removing (deleting) a conditionally enabled rights object, in order to be used in determining the recovery procedure.

It should also be noted that the Embodiment 1 of the present invention can be implemented also as a content play method performed by the memory card and a content player implemented as the mobile terminal.

More specifically, the content play method is used to play a content based on (a) a content and (b) a rights object that permits use of the content. The content play method includes: storing a content, a rights object, and a rights state for managing a state of the rights object; accessing the memory card to write the rights object to the memory card or to read the rights object from the memory card; determining the rights state by determining whether or not the rights object is permitted to be moved or removed (deleted); removing the rights object when the determination is made that the rights object is permitted to be removed; when the determination is made that the rights object is permitted to be moved, updating the rights state of the rights object to a "disabled state", copying the rights object in the memory card to the mobile terminal, changing the rights state of the rights object in the mobile terminal to a "conditionally enabled state", and updating the rights state of the rights object in the mobile terminal to an "enabled state" if the corresponding rights object in the memory card is removed.

(Embodiment 2)

In Embodiment 2, the description is given for a content player that generates and holds the rights state information 212 described in Embodiment 1 as a log including a value indicating one of processing steps until "move" of a rights object from the memory card to the content player (the mobile terminal) is correctly completed. Hereinafter, the log as the rights state information (hereinafter, referred to simply as a "log") includes a value indicating one of steps especially in the processing of "move". Such a log is generated and stored from start of the "move" until end of the "move". In other words, a log corresponding to "move" that has successfully been completed is removed (deleted). On the other hand, a log corresponding to "move" that is not correctly completed due to an error remains. Therefore, if there is a log of the rights object that is not in the move processing, the recovery procedure is necessary for the rights object.

The configuration of the system including the content player according to Embodiment 2 is the same as that of FIG. 2. Therefore, the configuration is not described again below.

Figure 7:
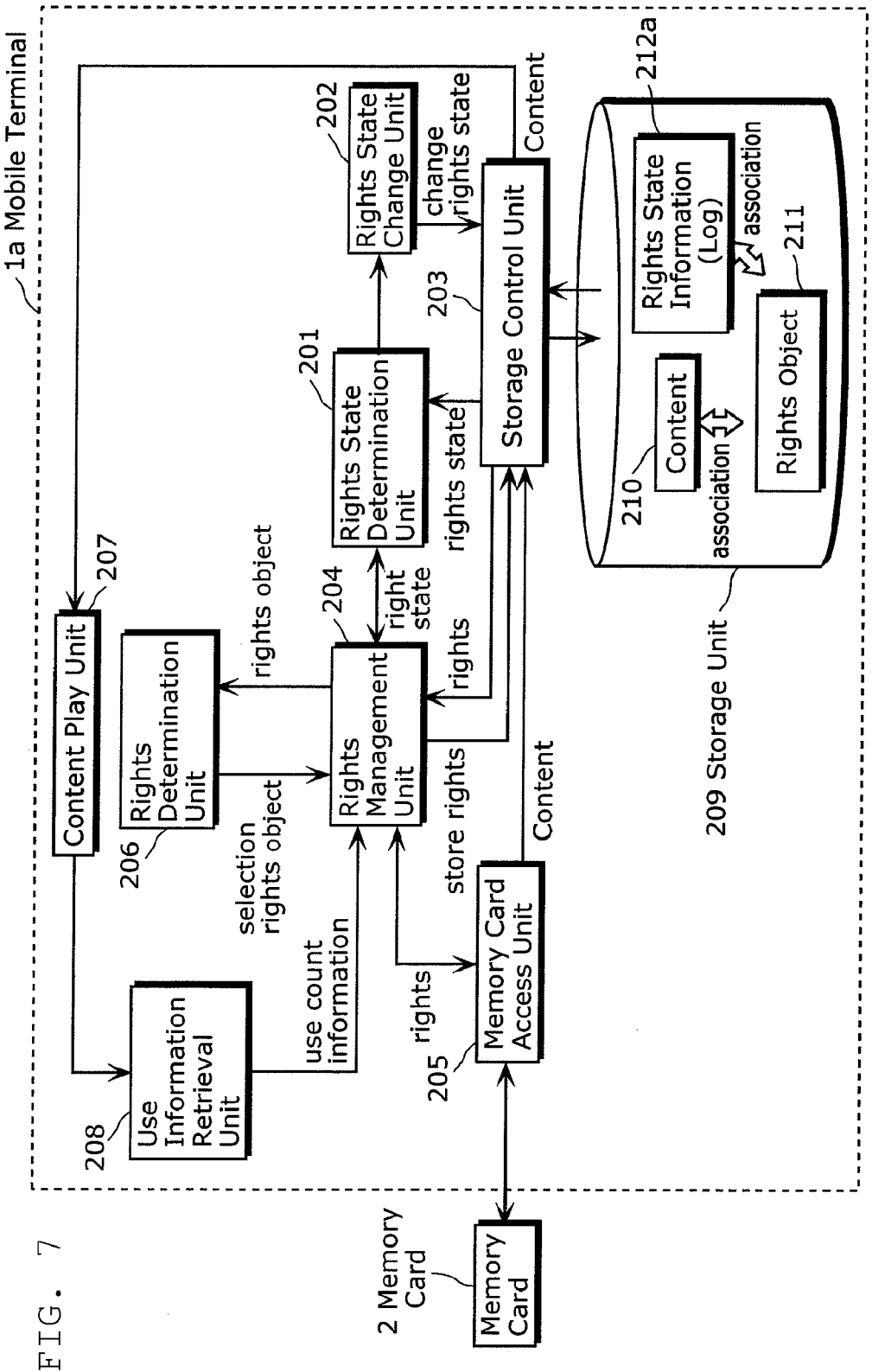
FIG. 7 is a block diagram showing a structure of a mobile terminal according to Embodiment 2 of the present invention.

FIG. 7 is a block diagram showing a structure of a mobile terminal according to Embodiment 2 of the present invention. A mobile terminal 1a of FIG. 7 differs from the mobile terminal 1 of FIG. 3 in generating and holding rights state information (log) 212a instead of the rights state information 212. The following mainly describes the difference.

Figure 8:
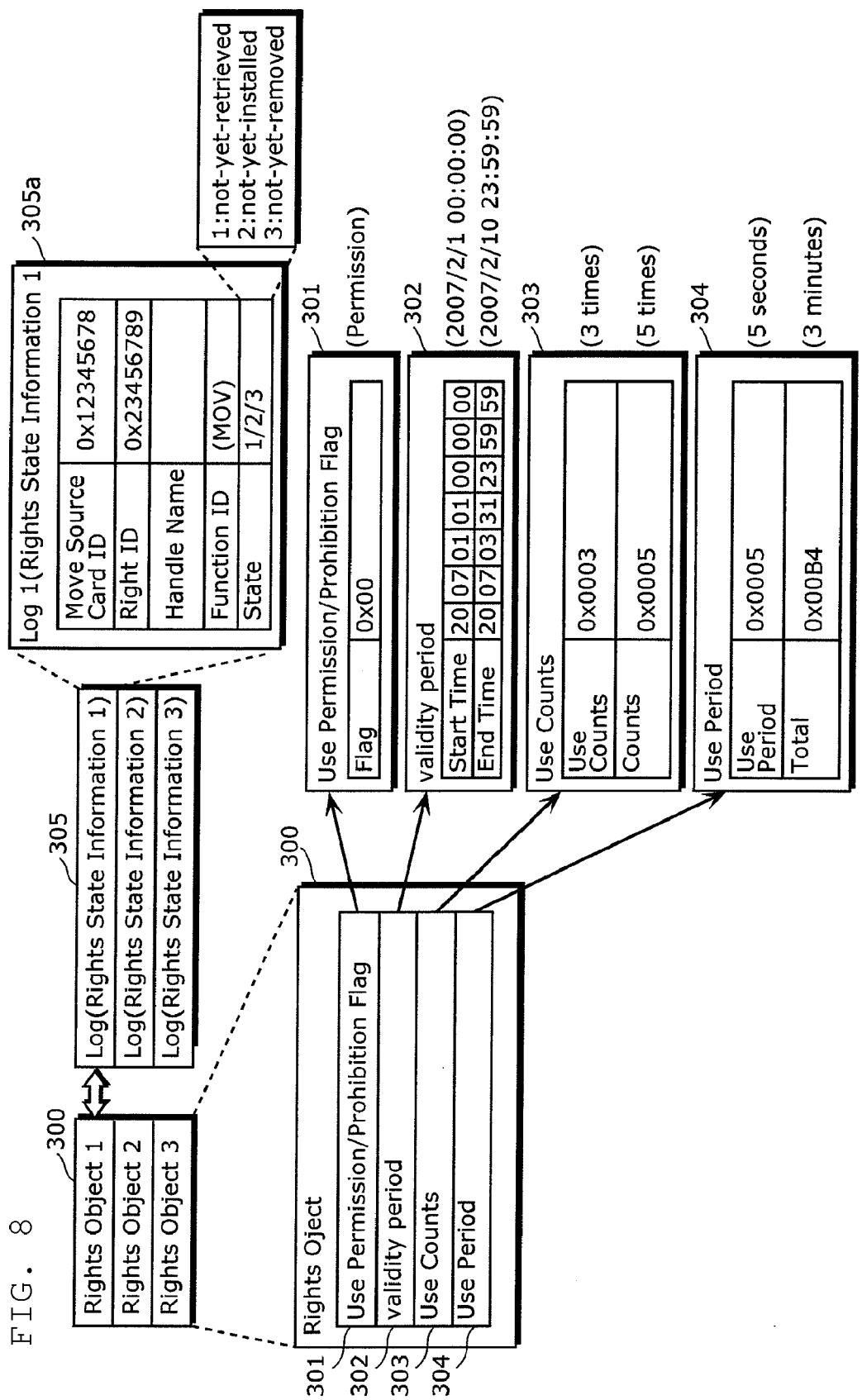
FIG. 8 is a diagram showing an example of data structures of a rights object and rights state information.

The rights state information 212a is generated and stored as the above-mentioned log. FIG. 8 is a diagram showing an example of a data structure of a rights object and a data structure of the rights state information (log) 212a. FIG. 8 differs from FIG. 4 in that rights state information (log) 212a (the numeral reference is assigned as 305a in FIG. 8) is generated and stored in the storage unit 209 instead of the rights state information 305. The rights state information 305a (hereinafter, a log 1) is generated and stored in association with a single rights object when "move" starts, and is removed (deleted) when the "move" is completed.

The rights state information (log) 305a includes a source card ID, a rights ID, a handle name, a function ID, and a state. The source ID is an identifier unique to the memory card. The rights ID is an identifier of a corresponding rights object. The handle name is another name of the corresponding rights object. In this example, the function ID indicates "move" of the corresponding rights object from the memory card to the mobile terminal ("MOV" in FIG. 8). The state indicates one of steps in the "move". In FIG. 8, the state indicates one of "1: not-yet-retrieved", "2: not-yet-installed", and "3: not-yet-removed". The state indicating the "not-yet-removed" from among the states corresponds to the "conditionally enabled state" in Embodiment 1, having the same meaning as the "conditionally enabled state".

Figure 9:
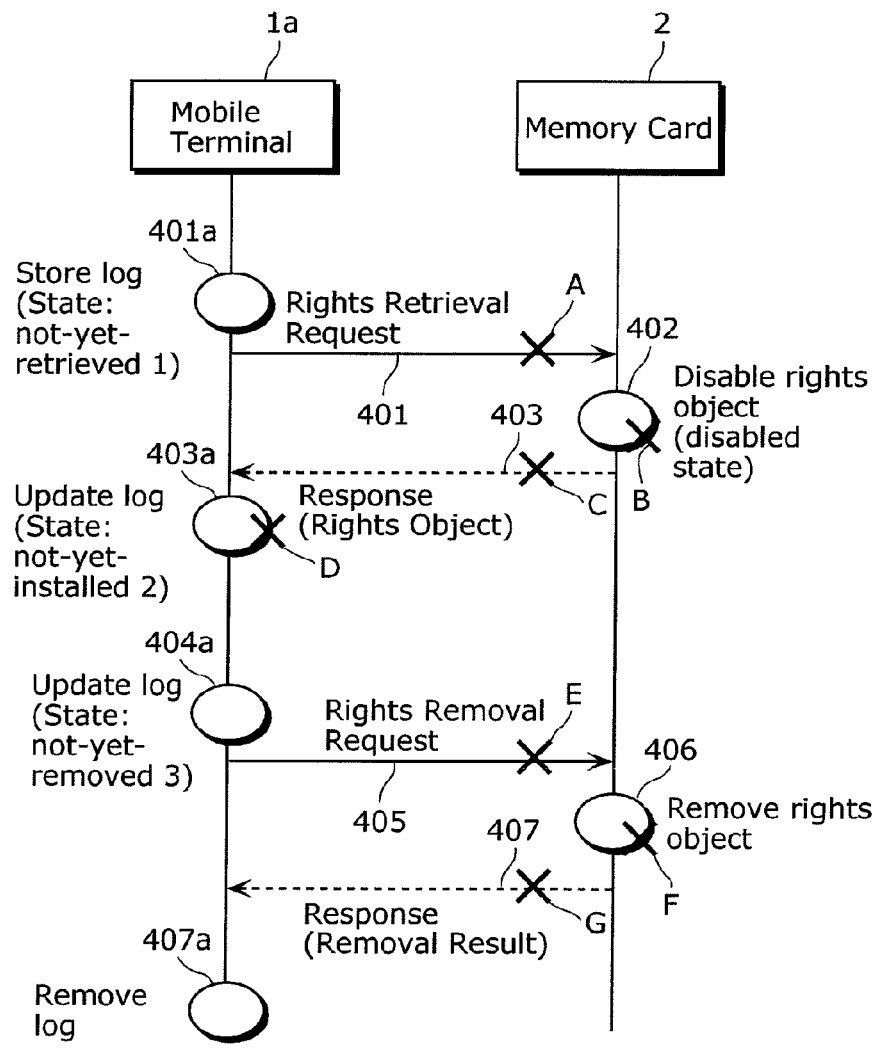
FIG. 9 is a diagram showing a sequence of moving a rights object from a memory card to a mobile terminal.

FIG. 9 is a diagram showing a sequence of moving a rights object from the memory card to the mobile terminal. Prior to the sequence of FIG. 9, the mobile terminal 1a previously confirms that there is no log corresponding to a target rights object to be moved. If there is such a log, the recovery procedure is performed.

The sequence of FIG. 9 differs from the sequence of FIG. 5 in adding steps 401a, 403a, 404a, and 407a. The following mainly describes the difference.

After confirming that there is no corresponding log, the mobile terminal 1a generates a log indicating that providing of a rights object from the memory card 2 to the mobile terminal 1a has not yet been started and stores the generated log to the storage unit 209 (401a), and then transmits a request for providing the rights object (hereinafter, referred to as a "rights retrieval request") to the memory card 2 (401). This rights retrieval request includes a rights ID, a handle name, a function ID, and the like of the rights object.

When the memory card receives the rights retrieval request, the memory card changes state information of the requested rights object indicating that the requested rights object is in an enabled state to indicate that the requested rights object is in a disabled state (402), and then copied the requested rights object to the mobile terminal in response to the rights retrieval request (403).

The mobile terminal 1a retrieves the rights object from the memory card (in other words, the content player installs (stores) the rights object). After starting the installation, the mobile terminal 1a updates the log to indicate that installation of the retrieved rights object in the content player has not yet been completed (403a). Immediately after completing the installation, the mobile terminal 1a updates the log to indicate that the removal of the rights object in the memory card has not yet been completed (404a), and also transmits a request (hereinafter, referred to as a "rights removal request") for removing the rights object in the memory card to the memory card (405).

The memory card receiving the rights removal request transmits a removal response indicating that the rights object has been removed from the memory card. In receiving the removal response, the mobile terminal 1a removes (deletes) the log from the storage unit 209 (407a). The removal of the log means that the processing "move" is completed correctly or by the recovery procedure.

On the other hand, no log means that the rights object is in an enabled state. In other words, when there is no log corresponding to the rights object, the mobile terminal 1a determines that the corresponding rights object is in the enabled state and thereby a corresponding content can be played according to the rights object.

Next, the recovery procedure in Embodiment 2 is described. The recovery procedure in Embodiment 2 is basically the same as the recovery procedure in Embodiment 1. However, the recovery procedure in Embodiment 2 differs from the recovery procedure in Embodiment 1 in that the "conditionally enabled state" can be generated in a log in more details as states including the "not-yet-removed" state, and that the log is removed (deleted) instead of enabling the rights object. The following mainly describes the difference.

Figure 10:
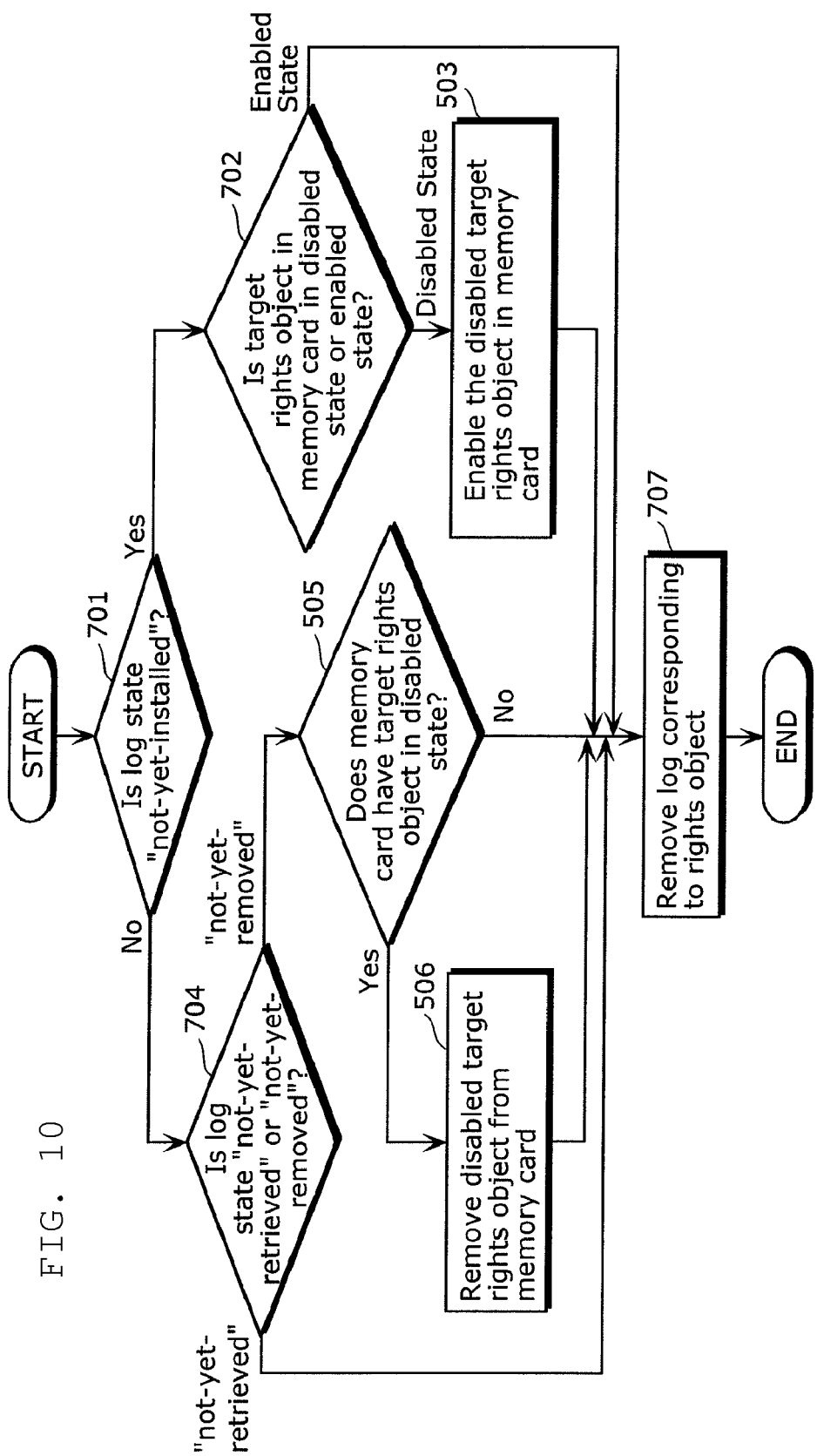
FIG. 10 is a flowchart showing a recovery procedure.

Each of A to E represented by symbols X in FIG. 9 indicates an example of a position where an error occurs due to, for example, taking out of the memory card, power discontinuity, or noise during the "move". The recovery procedure is described with reference to the examples. FIG. 10 is a flowchart of the recovery procedure. FIG. 11A is a table regarding recovery procedures corresponding to the respective errors of A to E represented by symbols X.

Errors A and B in FIG. 9 correspond to a step 701 and a step 704 in FIG. 10, respectively. Errors C and D in FIG. 9 correspond to a step 702 and a step 503 in FIG. 10, respectively.

Errors E and F in FIG. 9 correspond to the step 704, a step 505, a step 506, and a step 707 in FIG. 10. An Error G in FIG. 9 corresponds to the step 704, the step 505, and the step 506 in FIG. 10.

If there is a log having a function ID indicating "move", the mobile terminal 1a performs a recovery procedure.

The recovery procedure for the error E or F is described.

If the mobile terminal 1a has a log with a state indicating the "not-yet-removed" state and the memory card has state information indicating that a rights object corresponding to the log is in a disable state (Yes at 503), the mobile terminal 1a removes (deletes) the rights object and the state information from the memory card (506) and removes the log(707). Since the log indicating the "not-yet-removed" state is not removed from the mobile terminal 1a even after consuming the rights object, the log needs to be removed without enabling the disabled rights object in the memory card. Thereby, it is possible to prevent the rights object from being used without permission by maliciously using the conventional recovery procedure.

The recovery procedure for the error G is described.

If the mobile terminal 1a has a log with a state indicating the "not-yet-removed" state and the memory card does not have a rights object corresponding to the log, the mobile terminal 1a removes (deletes) the log(505, 707). Thereby, when an error occurs in the removal response transmitted from the memory card and thereby the mobile terminal 1a still has a log indicating the "not-yet-removed" state even if the disabled rights object has been removed from the memory card, it is possible to recover a situation of the rights object by removing the log so as to express that the rights object is in a general enabled state.

The recovery procedure for the error C or D is described.

If the mobile terminal 1a has a log with a state indicating the "not-yet-installed" state and does not have a rights object corresponding to the log, and the memory card has the corresponding rights object and state information indicating that the corresponding rights object is in a disable state (702), the mobile terminal 1a changes the state information in the memory card to indicate an enabled state (503) and removes (deletes) the log(707). Thereby, even if an error occurs before completing the installation of the rights object from the memory card to the mobile terminal 1a, a situation of the rights object can be recovered to be the situation that is before starting the move.

The recovery procedure for the error A or B is described.

If the mobile terminal 1a has a log with a state indicating the "not-yet-retrieved" state (704), the mobile terminal 1a removes (deletes) the log(707). Thereby, a situation of the rights object can be recovered to be the situation that is before starting the move.

As described above, in the recovery procedure in Embodiment 2, which recovery procedure is to be performed can be determined with reference to the state data in the log when the log exists. Therefore, the recovery procedure in Embodiment 2 can be performed at a high speed.

In the meanwhile, FIG. 11B is a table regarding recovery procedures corresponding to respective occurred errors according to Embodiment 1. FIG. 11B shows the recovery procedures corresponding to the respective errors A to G shown in FIG. 9.

FIG. 11B differs from FIG. 11A in that the "conditionally enabled state" can be generated in a log in more details as states including the "not-yet-removed" state, and that the log is removed (deleted) instead of enabling the rights object. However, FIG. 11B is basically the same as FIG. 11A.

It should be noted that each of the embodiments can be implemented also as a program executed by the memory card and the content player implemented as the mobile terminal. It should also be noted that the mobile terminal has been described as an example of the content player, but the content player may be any electronic device having a function of playing contents and a slot for memory cards. For example, the content player may be a digital still camera, a music player, or an electronic dictionary.

It should also be noted that, when the embodiments are implemented in the terminal, the rights management unit, the rights determination unit, the rights state determination unit, the rights state change unit, the content play unit, the memory card access unit, and the storage unit may be implemented together into a single chip of an integrated circuit or separately into a plurality of chips in a Large-Scale Integration (LSI) (semiconductor device).

INDUSTRIAL APPLICABILITY

The content player according to the present invention is permitted to consume rights of a rights object at the time of completing move of a rights object from a card to the content player, and prevents the rights object from being used without permission. Thereby, the content player according to the present invention is useful in a system using a content with a protected copyright utilizing the rights object.

The invention claimed is:

1. A rights object moving method of moving a rights object indicating use rights of a content from a memory card to a content player, the memory card being capable of being inserted to and taken out from the content player and holding (a) the rights object and (b) a first state information indicating whether or not the rights object is enabled or disabled, said rights object moving method comprising:

transmitting, from the content player to the memory card, a retrieval request for providing the rights object to the content player;

generating second state information to be held in the content player, the second state information identifying a state of the rights object;

changing the first state information indicating that the rights object in the memory card is enabled to indicate that the rights object in the memory card is disabled, when the memory card receives the retrieval request;

installing, to the content player, the rights object provided from the memory card in response to the retrieval request;

updating, after starting said installing, the second state information to indicate that said installing of the rights object has not yet been completed;

transmitting a removal request from the content player to the memory card upon completing said installing, the removal request requesting to remove the rights object in the memory card;

updating, after said transmitting of the removal request, the second state information indicating (i) that said installing of the rights object has not yet been completed to indicate (ii) that removing of the rights object in the memory card has not yet been completed;

controlling to (i) prohibit the rights object in the content player from being moved or removed and (ii) permit the rights object in the content player to be used to play the content, in a case that the second state information indicates that the removing of the rights object in the memory card has not yet been completed;

removing the rights object in the memory card and transmitting a removal response for notifying completion of said removing from the memory card to the content player, when the memory card receives the removal request; and updating the second state information indicating that said removing of the rights object in the memory card has not yet been completed to indicate that the rights object in the content player is enabled, when the content player receives the removal response.

2. The rights object moving method according to claim 1, further comprising removing, from the content player, the second state information indicating that said removing of the rights object in the memory card has not yet been completed, when the content player receives the removal response.

3. The rights object moving method according to claim 2, further comprising:

determining that the rights object in the content player is enabled and permitting the rights object in the content player to be used to play the content, when the content player does not have the second state information indicating that said removing of the rights object in the memory card has not yet been completed.

4. The rights object moving method according to claim 1, wherein the second state information to be held in the content player is generated after said transmitting of the retrieval request, the generated second state information indicating that the providing of the rights object from the memory card to the content player has not yet been started; and wherein, after starting said installing, the second state information indicating that the providing of the rights object from the memory card to the content player has not yet been started is updated to indicate that said installing of the rights object has not yet been completed.

5. The rights object moving method according to claim 1, further comprising recovering a situation of the rights object, wherein said recovering includes removing the rights object in the memory card and the first state information from the memory card, when (i) the content player has the second state information indicating that said removing of the rights object in the memory card has not yet been completed and (ii) the memory card has the first state information indicating that the rights object in the memory card is disabled.

6. The rights object moving method according to claim 5, wherein said recovering further includes updating the second state information indicating that said removing of the rights object in the memory card has not yet been completed to indicate that the rights object in the content player is enabled, when (i) the content player has the second state information indicating that said removing of the rights object in the memory card has not yet been completed and (ii) the memory card does not have the rights object.

7. The rights object moving method according to claim 5, wherein said recovering further includes removing the second state information, when (i) the content player has the second state information indicating that said removing of the rights object in the memory card has not yet been completed and (ii) the memory card does not have the rights object.

8. The rights object moving method according to claim 1, further comprising recovering a situation of the rights object, wherein said recovering further includes changing the first state information in the memory card to indicate that the rights object in the memory card is enabled, when (i) the content player has the second state information indicating that said installing of the rights object has not yet been completed and does not have the rights object, and (ii) the memory card has (ii-1) the first state information indicating that the rights object in the memory card is disabled and (ii-2) the rights object.

9. The rights object moving method according to claim 8, wherein said recovering further includes removing the second state information, when (i) the content player has the second state information indicating that said removing of the rights object in the memory card has not yet been completed and (ii) the memory card does not have the rights object.

10. A content player that moves a rights object indicating use rights of a content from a memory card to said content player and plays the content according to the rights object, the memory card holding (a) the rights object and (b) a first state information indicating whether or not the rights object is enabled or disabled, said content player comprising:

a memory card slot from which the memory card is capable of being inserted to and taken out;

a retrieval request unit configured to transmit, to the memory card, a retrieval request for providing the rights object to said content player, and cause the memory card to change the first state information indicating that the rights object in the memory card is enabled to indicate that the rights object in the memory card is disabled;

an installation unit configured to install, to said content player, the rights object provided from the memory card in response to the retrieval request;

a removal request unit configured to transmit a removal request from said content player to the memory card after completing the installation, the removal request requesting to remove the rights object in the memory card;

a generating unit configured to generate and hold second state information in said content player, the second state information identifying a state of the rights object;

a control unit configured to (i) prohibit the rights object in said content player from being moved or removed and (ii) permitting the rights object in said content player to be used to play the content, in a case that the second state information indicates that removing of the rights object in the memory card has not yet been completed; and an updating unit configured to:
  (i) update, after starting the installing of the rights object by the installation unit, the second state information to indicate that the installing of the rights object has not yet been completed;
  (ii) update, after the removal request is transmitted by the removal request unit, the second state information indicating (i) that the installing of the rights object has not yet been completed to indicate (ii) that the removing of the rights object in the memory card has not yet been completed; and
  (iii) update the second state information indicating that the removing of the rights object in the memory card has not yet been completed to indicate that the rights object in the content player is enabled, when the content player receives the removal response.

11. A semiconductor device that (i) moves a rights object indicating use rights of a content from a memory card to said semiconductor device via a memory card slot from which the memory card is capable of being inserted to and taken out from said semiconductor device and (ii) plays the content according to the rights object, the memory card holding (a) the rights object and (b) a first state information indicating whether or not the rights object is enabled or disabled, said semiconductor device comprising:

- a retrieval request unit configured to transmit, to the memory card, a retrieval request for providing the rights object to said semiconductor device, and cause the memory card to change the first state information indicating that the rights object in the memory card is enabled to indicate that the rights object in the memory card is disabled;
- an installation unit configured to install, to said semiconductor device, the rights object provided from the memory card in response to the retrieval request;
- a removal request unit configured to transmit a removal request to the memory card after completing the installation, the removal request requesting to remove the rights object in the memory card;
- a generating unit configured to generate and hold second state information in said content player, the second state information identifying a state of the rights object;
- a control unit configured to (i) prohibit the rights object in said content player from being moved or removed and (ii) permitting the rights object in said content player to be used to play the content, in a case that the second state information indicates that removing of the rights object in the memory card has not yet been completed; and
- an updating unit configured to:
  - (i) update, after starting the installing of the rights object by the installation unit, the second state information to indicate that the installing of the rights object has not yet been completed;
  - (ii) update, after the removal request is transmitted by the removal request unit, the second state information indicating (i) that the installing of the rights object has not yet been completed to indicate (ii) that the removing of the rights object in the memory card has not yet been completed; and
  - (iii) update the second state information indicating that the removing of the rights object in the memory card has not yet been completed to indicate that the rights object in the content player is enabled, when the content player receives the removal response.

12. A non-transitory computer-readable medium having a program stored thereon for moving a rights object indicating use rights of a content from a memory card to a content player, the memory card being capable of being inserted to and taken out from the content player and holding (a) the rights object and (b) a first state information indicating whether or not the rights object is enabled or disabled, the program causing a computer to execute a method comprising:

- transmitting, from the content player to the memory card, a retrieval request for providing the rights object to the content player;
- generating second state information to be held in the content player, the second state information identifying a state of the rights object;
- changing the first state information indicating that the rights object in the memory card is enabled to indicate that the rights object in the memory card is disabled, when the memory card receives the retrieval request;
- installing, to the content player, the rights object provided from the memory card in response to the retrieval request;
- updating, after starting said installing, the second state information to indicate that said installing of the rights object has not yet been completed;
- transmitting a removal request from the content player to the memory card upon completing said installing, the removal request requesting to remove the rights object in the memory card;
- updating, after said transmitting of the removal request, the second state information indicating (i) that said installing of the rights object has not yet been completed to indicate (ii) that removing of the rights object in the memory card has not yet been completed;
- controlling to (i) prohibit the rights object in the content player from being moved or removed and (ii) permit the rights object in the content player to be used to play the content, in a case that the second state information indicates that the removing of the rights object in the memory card has not yet been completed;
- removing the rights object in the memory card and transmitting a removal response for notifying completion of said removing from the memory card to the content player, when the memory card receives the removal request; and
- updating the second state information indicating that said removing of the rights object in the memory card has not yet been completed to indicate that the rights object in the content player is enabled when the content player receives the removal response.

* * * * *